US011681268B2

(12) United States Patent
Kobayashi et al.

(10) Patent No.: US 11,681,268 B2
(45) Date of Patent: Jun. 20, 2023

(54) SEMICONDUCTOR MANUFACTURING SYSTEM, CONTROL DEVICE, AND CONTROL METHOD

(71) Applicant: Tokyo Electron Limited, Tokyo (JP)

(72) Inventors: Kenichi Kobayashi, Sapporo (JP); Takehiro Kinoshita, Sapporo (JP); Takashi Oe, Tokyo (JP); Noriaki Kanaya, Sapporo (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 0 days.

(21) Appl. No.: 17/460,676

(22) Filed: Aug. 30, 2021

(65) Prior Publication Data

US 2022/0066418 A1 Mar. 3, 2022

(30) Foreign Application Priority Data

Aug. 31, 2020 (JP) .............................. JP2020-146310

(51) Int. Cl.
*G06F 3/14* (2006.01)
*G05B 19/4093* (2006.01)
*H04L 12/28* (2006.01)

(52) U.S. Cl.
CPC ......... *G05B 19/40937* (2013.01); *G06F 3/14* (2013.01); *G05B 2219/45031* (2013.01); *H04L 12/28* (2013.01)

(58) Field of Classification Search
CPC ............ G06F 3/14; G05B 2219/45031; G05B 2219/24102; G05B 2219/31457
See application file for complete search history.

(56) References Cited

U.S. PATENT DOCUMENTS

| 2012/0306915 | A1* | 12/2012 | Takemura | G09G 5/397 345/629 |
| 2016/0034153 | A1* | 2/2016 | Lejeune | G06F 3/04842 715/765 |
| 2017/0078504 | A1* | 3/2017 | Nagata | G09G 5/14 |
| 2019/0095072 | A1* | 3/2019 | Du | G06F 3/0488 |

FOREIGN PATENT DOCUMENTS

JP 2008-251050 A 10/2008

* cited by examiner

*Primary Examiner* — Samantha (Yuehan) Wang
(74) *Attorney, Agent, or Firm* — Venjuris, P.C.

(57) ABSTRACT

A semiconductor manufacturing system includes: a local operation terminal that displays an apparatus screen of a semiconductor manufacturing apparatus; at least one remote operation terminals that are connected to the semiconductor manufacturing apparatus via a network, and display the apparatus screen; and a controller that controls the semiconductor manufacturing apparatus based on an operation received from a user by the local operation terminal and the remote operation terminal that display the apparatus screen. The control device includes: a login state managing unit; an apparatus screen display state managing unit; and a screen data creating unit that creates screen data of the apparatus screen based on the simultaneous login state and the apparatus screen display state.

14 Claims, 8 Drawing Sheets

FIG. 7

| SIMULTANEOUS OPERATION OF LOCAL AND REMOTE | TYPE OF RESTRICTION | | | CHANGE OF RESTRICTION STATE |
|---|---|---|---|---|
| POSSIBLE | NO RESTRICTION | | | |
| | SCREEN DISPLAY IMPOSSIBLE (MENU NOT-DISPLAYED) | | | FIXED |
| | | | | DYNAMIC CHANGE |
| | SCREEN DISPLAY POSSIBLE | SIMULTANEOUS USE POSSIBLE | COMMAND EXECUTION RESTRICTION | FIXED |
| | | | | DYNAMIC CHANGE |
| | | | EDITING RESTRICTION | FIXED |
| | | | | DYNAMIC CHANGE |
| IMPOSSIBLE | ONLY LOCAL OPERATION POSSIBLE | | | |

SEMICONDUCTOR MANUFACTURING SYSTEM, CONTROL DEVICE, AND CONTROL METHOD

CROSS-REFERENCE TO RELATED APPLICATIONS

This application is based on and claims priority from Japanese Patent Application No. 2020-146310 filed on Aug. 31, 2020 with the Japan Patent Office, the disclosure of which is incorporated herein in its entirety by reference.

TECHNICAL FIELD

The present disclosure relates to a semiconductor manufacturing system, a control device, a control method, and a storage medium that stores a program.

BACKGROUND

A semiconductor manufacturing apparatus includes, for example, a controller configured to control its own operation. The controller may be provided with an input device and a display device. An operator inputs a command or information to the controller via the input device to control the semiconductor manufacturing apparatus, and confirms, for example, a setting of a processing condition or a current state of the semiconductor manufacturing apparatus displayed on the display device. The operator may control or monitor the semiconductor manufacturing apparatus from the input device or the display device provided in the controller at a place in a clean room where the semiconductor manufacturing apparatus is installed.

In general, a semiconductor manufacturing apparatus is installed in a clean room. Since the environment in the clean room needs to be maintained constant, it is necessary to suppress the entry and exit of people as much as possible. A remote control system in which the semiconductor manufacturing apparatus installed in the clean room is connected to a computer outside the clean room via a network, and an action of the processing device is controlled or monitored by the computer is known in the related art (see, e.g., Japanese Patent Laid-Open Publication No. 2008-251050).

SUMMARY

A semiconductor manufacturing system according to an aspect of the present disclosure includes a local operation terminal configured to display an apparatus screen of a semiconductor manufacturing apparatus, at least one remote operation terminal connected to the semiconductor manufacturing apparatus via a network, and configured to display the apparatus screen of the semiconductor manufacturing apparatus, and a controller configured to control the semiconductor manufacturing apparatus based on an operation received from a user by the local operation terminal and the remote operation terminal that display the apparatus screen. The controller includes a login state managing unit that manages a simultaneous login state from the local operation terminal and the remote operation terminal, an apparatus screen display state managing unit that manages apparatus screen display states of the local operation terminal and the remote operation terminal that are logged in, and a screen data creating unit that creates screen data of the apparatus screen sent to the local operation terminal and the remote operation terminal that are logged in for each of the local operation terminal and the remote operation terminal based on the simultaneous login state and the apparatus screen display state.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 7 is a classification diagram illustrating an example of exclusive control of an apparatus screen in the embodiment.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made without departing from the spirit or scope of the subject matter presented here.

Hereinafter, embodiments of the present disclosure will be described with reference to the drawings.

[System Configuration]

Figure 1:
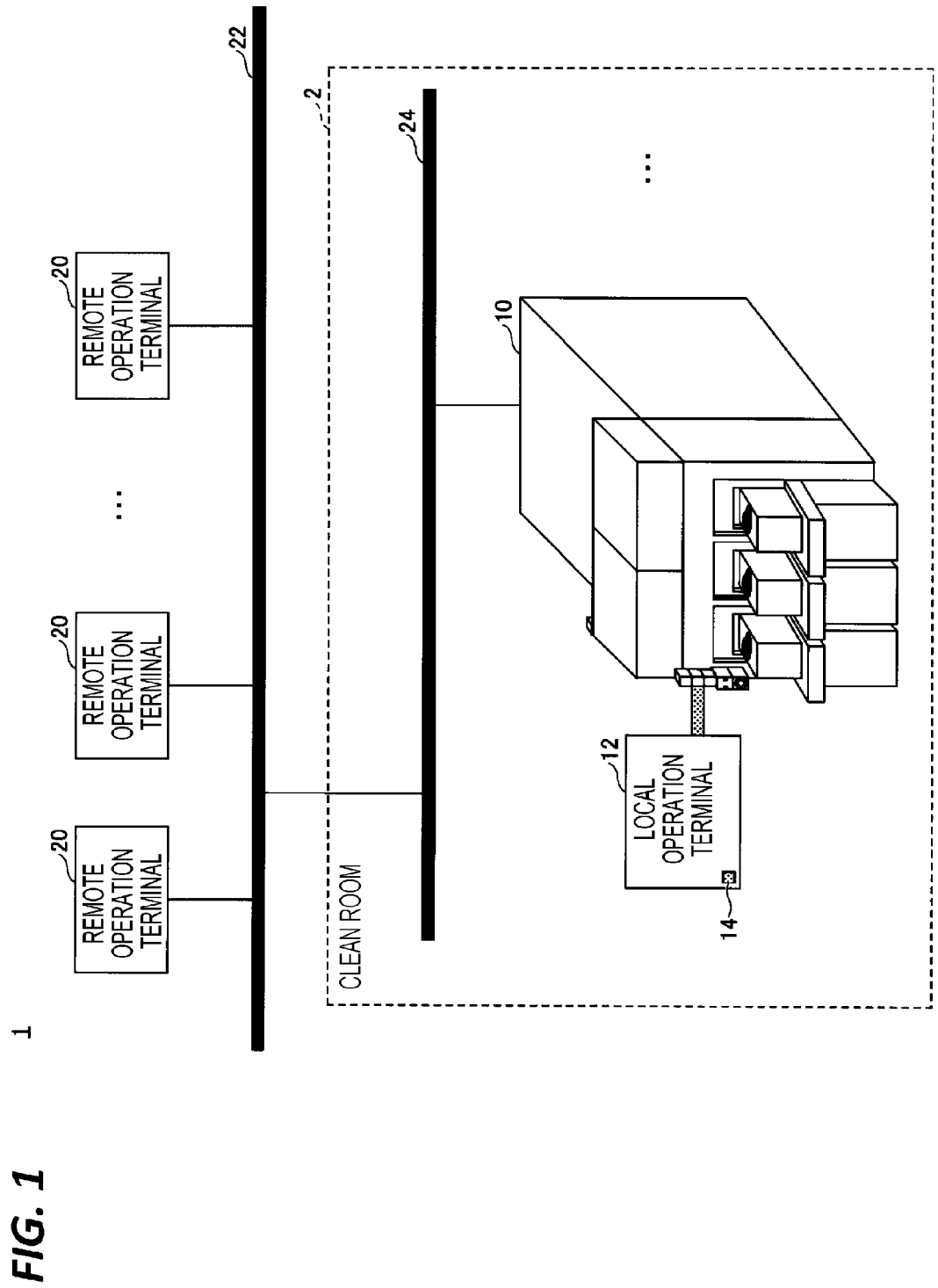
FIG. 1 is a configuration view of an example of a semiconductor manufacturing system according to an embodiment.

FIG. 1 is a configuration view of an example of a semiconductor manufacturing system 1 according to an embodiment. The semiconductor manufacturing system 1 illustrated in FIG. 1 includes a semiconductor manufacturing apparatus 10, a local operation terminal 12, and remote operation terminals 20. The semiconductor manufacturing system 1 is a system constructed to remotely control the semiconductor manufacturing apparatus 10 from the local operation terminal 12 and one or more remote operation terminals 20.

One or more semiconductor manufacturing apparatuses 10 are installed in a clean room 2. The semiconductor manufacturing apparatus 10 is communicably connected via a network 24 such as a local area network (LAN). The semiconductor manufacturing apparatus 10 is an apparatus that performs processings such as a film forming processing, etching, and photolithography.

The semiconductor manufacturing apparatus 10 includes a processor that performs a processing on a workpiece, and a controller that controls the processor. Although the controller provided in the semiconductor manufacturing apparatus 10 is not illustrated, FIG. 1 illustrates the local operation terminal 12 serving as a display/input device of the controller and attached to the semiconductor manufacturing apparatus 10.

The remote operation terminals 20 are installed outside the clean room 2, for example, in an office, and communicably connected via a network 22 such as LAN. The network 22 is communicably connected to the network 24 in the clean room 2. The remote operation terminals 20 installed in, for example, the office may communicate with the controller of the semiconductor manufacturing apparatus 10 via the networks 22 and 24.

In the semiconductor manufacturing system 1 in FIG. 1, an apparatus screen of the semiconductor manufacturing apparatus 10 is displayed on the local operation terminal 12 and the remote operation terminals 20, and the semiconductor manufacturing apparatus 10 may be controlled based on an operation of a user (operator) on the apparatus screen. As will be described later, the controller of the semiconductor manufacturing apparatus 10 receives simultaneous login (multi-login) by a plurality of users, and may display different apparatus screens on the local operation terminal 12 and the remote operation terminals 20 operated by users who are logged in (hereinafter, referred to as "the local operation terminal 12 and the remote operation terminals 20 that are logged in").

As a result, in the semiconductor manufacturing system 1 in FIG. 1, the different apparatus screens are independently displayed simultaneously on the local operation terminal 12 and one or more remote operation terminals 20 that are logged in to the controller of the same semiconductor manufacturing apparatus 10, and it is possible to control the semiconductor manufacturing apparatus 10 from the different apparatus screens. The controller of the semiconductor manufacturing apparatus 10 performs exclusive control of the apparatus screens displayed on the local operation terminal 12 and one or more remote operation terminals 20 that are logged in as described later.

In the semiconductor manufacturing system 1 in FIG. 1, users who are logged in to the controller of the same semiconductor manufacturing apparatus 10 from the local operation terminal 12 and one or more remote operation terminals 20 may browse the different apparatus screens, and may operate the same semiconductor manufacturing apparatus 10 from the different (individual) apparatus screens.

The local operation terminal 12 includes a local/remote changeover switch 14, and receives a selection of the local operation terminal 12 or a remote operation terminal 20 from a user. The local operation terminal 12 and the remote operation terminal 20 are implemented by, for example, a personal computer (PC), a tablet terminal, a smartphone, or a dedicated terminal.

Further, the semiconductor manufacturing apparatus 10 may incorporate the controller as illustrated in FIG. 1, or may not necessarily incorporate the controller as long as they are communicably connected with each other. The controller has a computer configuration that controls the semiconductor manufacturing apparatus 10. For example, the controller outputs a parameter that controls the control component of the semiconductor manufacturing apparatus 10 according to the recipe to the semiconductor manufacturing apparatus 10.

The controller receives an operation for the semiconductor manufacturing apparatus 10 from a user, and functions as a user interface (UI) that allows the user to browse information about the semiconductor manufacturing apparatus 10. For example, the UI function of the controller is to manage the apparatus screens displayed on the local operation terminal 12 and the remote operation terminals 20 as described later.

The semiconductor manufacturing system 1 in FIG. 1 is an example, and it goes without saying that there are various examples of a system configuration depending on the application or purpose. For example, the semiconductor manufacturing system 1 may have various configurations such as a configuration in which the controller of each of the semiconductor manufacturing apparatuses 10 is integrated into a controller for a plurality of semiconductor manufacturing apparatuses 10, or a configuration in which the controller is further divided.

[Hardware Configuration]

Figure 2:
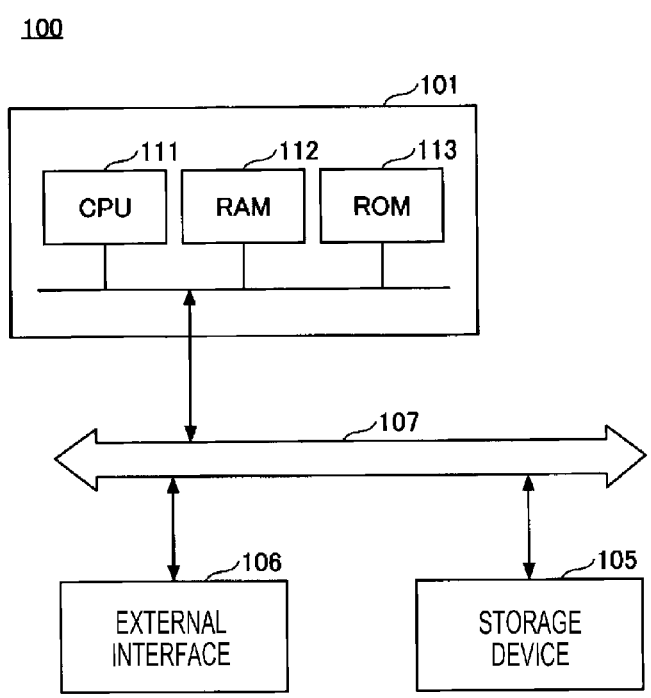
FIG. 2 is a hardware configuration view of an example of a computer.

The controller of the semiconductor manufacturing system 1 illustrated in FIG. 1 is implemented by a computer 100, for example, having a hardware configuration illustrated in FIG. 2. FIG. 2 is a hardware configuration view of an example of a computer.

The computer 100 includes a main control unit 101, a storage device 105, an external interface 106, and a bus 107 that connects them to each other. The main control unit 101 includes a central processing unit (CPU) 111, a random access memory (RAM) 112, and a read only memory (ROM) 113. The storage device 105 is configured to record or read a program or information necessary for control. The storage device 105 includes a computer readable storage medium such as a hard disk drive (HDD). For example, a recipe for a required processing on a wafer is stored in the storage medium.

In the controller, the CPU 111 uses the RAM 112 as a working area and executes the program stored in the ROM 113 or the storage medium of the storage device 105, thereby displaying the apparatus screen on the local operation terminal 12 and the remote operation terminals 20, and the semiconductor manufacturing apparatus 10 is controlled based on the operation of a user on the apparatus screen.

Figure 3:
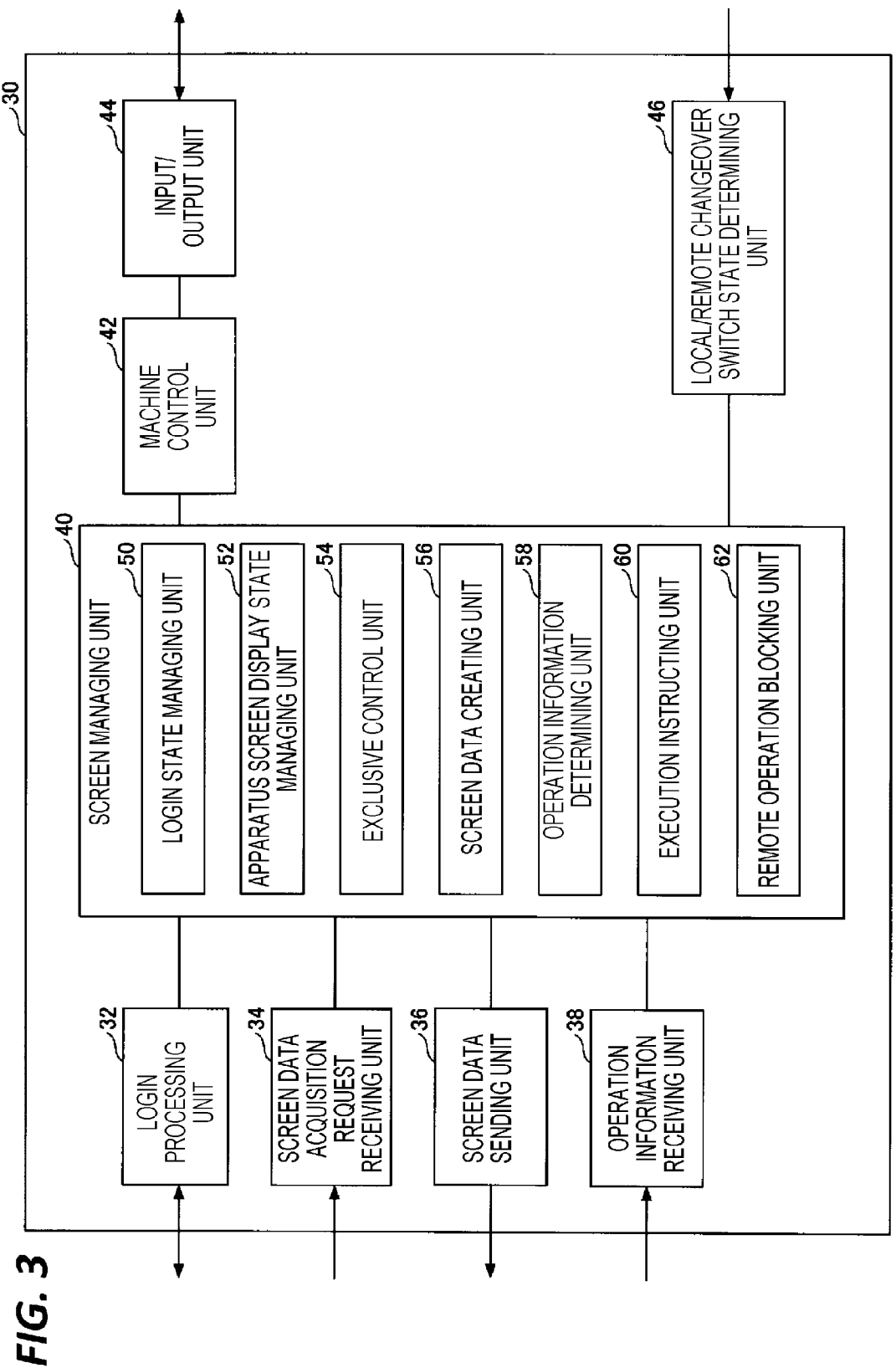
FIG. 3 is a functional block diagram of an example of a controller according to the embodiment.

The controller of the semiconductor manufacturing apparatus 10 may implement various functions in FIG. 3, for example, by executing the program with the hardware configuration of the computer 100 in FIG. 2.

[Functional Configuration]

A controller 30 of the semiconductor manufacturing system 1 according to the embodiment implements, for example, functional blocks in FIG. 3. FIG. 3 is a functional block diagram of an example of the controller according to the embodiment. In the functional block diagram in FIG. 3, illustrations of configurations unnecessary for the description of the embodiment are omitted.

The controller 30 executes the program to implement a login processing unit 32, a screen data acquisition request receiving unit 34, a screen data sending unit 36, an operation information receiving unit 38, a screen managing unit 40, a machine controller 42, an input/output unit 44, and a local/remote changeover switch state determining unit 46.

The login processing unit 32 performs a login processing for a login request from the local operation terminal 12 and the remote operation terminals 20. The screen data acquisition request receiving unit 34 receives a screen data acquisition request from, for example, an application program (hereinafter, simply referred to as an "application") installed in the local operation terminal 12 and the remote operation terminals 20. The screen data sending unit 36 sends screen data created based on the screen data acquisition request to the local operation terminal 12 and the remote operation terminals 20 of the screen data acquisition request source.

For example, the application installed in the local operation terminal 12 and the remote operation terminals 20 displays based on the received screen data. The screen based on the received screen data includes the apparatus screen of the semiconductor manufacturing apparatus 10. The user that operates the local operation terminal 12 and the remote operation terminals 20 may control the semiconductor manufacturing apparatus 10 by operating the apparatus screen.

For example, the local operation terminal 12 and the remote operation terminals 20 that display the apparatus screen send operation information to the controller 30 based on the operation of a user on the apparatus screen. Here, the operation information may be information that can notify the controller 30 of the operation of the user on the screen such as the apparatus screens displayed by the local operation terminal 12 and the remote operation terminals 20. The operation information receiving unit 38 of the controller 30 receives the operation information received from the local operation terminal 12 and the remote operation terminals 20.

The controller 30 receives the simultaneous login from the local operation terminal 12 and the remote operation terminals 20 by a plurality of users, and opens a plurality of communication ports so as to display the different apparatus screens on the local operation terminal 12 and the remote operation terminals 20 that are logged in. The controller 30 runs, for example, a plurality of virtual network computing (VNC) servers, and may simultaneously display the independent individual apparatus screen on the local operation terminal 12 and the remote operation terminals 20 by port numbers.

The screen managing unit 40 manages the screen displayed on the local operation terminal 12 and the remote operation terminals 20 that are logged in. The screen managing unit 40 is configured to include a login state managing unit 50, an apparatus screen display state managing unit 52, an exclusive controller 54, a screen data creating unit 56, an operation information determination unit 58, an execution instructing unit 60, and a remote operation blocking unit 62.

The login state managing unit 50 manages information (login state) about the local operation terminal 12 and the remote operation terminals 20 that are logged in. The apparatus screen display state managing unit 52 manages information (apparatus screen display state) about the apparatus screens that are displayed on the local operation terminal 12 and the remote operation terminals 20 that are logged in. The exclusive controller 54 performs exclusive control of the apparatus screens displayed on the local operation terminal 12 and one or more remote operation terminals 20 that are logged in. In the semiconductor manufacturing system 1 of the embodiment, since the local operation terminal 12 and one or more remote operation terminals 20 that are logged in simultaneously display the independent apparatus screens, necessary exclusive control including whether to display or not is performed.

The screen data creating unit 56 creates screen data according to a screen data acquisition request received from the local operation terminal 12 and the remote operation terminals 20 that are logged in, a login state, an apparatus screen display state, and a result of the exclusive control. The apparatus screen on which the screen data creating unit 56 creates the screen data includes a plurality of screens depending on the type of information to be displayed.

For example, during a normal operation, the apparatus screen may display each type of data such as a gas flow state or temperature on a different screen. Further, during a maintenance work, the apparatus screen may display a different screen for each type of work. The screen data creating unit 56 creates screen data according to the screen data acquisition request received from the local operation terminal 12 and the remote operation terminals 20 that are logged in from the plurality of screens of the apparatus screen.

The operation information determination unit 58 determines, based on operation information received from the local operation terminal 12 and one or more remote operation terminals 20 that are logged in, whether or not the execution instruction to the semiconductor manufacturing apparatus 10 according to the operation information is possible. In the semiconductor manufacturing system 1 of the embodiment, since the local operation terminal 12 and one or more remote operation terminals 20 that are logged in simultaneously display the independent apparatus screens, necessary determination including whether to execute the instruction according to the operation information or not is performed. The execution instructing unit 60 executes the execution instruction according to the operation information when the execution instruction to the semiconductor manufacturing apparatus 10 according to the operation information is possible.

When the local/remote changeover switch 14 is switched from the selected state of the remote operation terminals 20 to the selected state of the local operation terminal 12, the remote operation blocking unit 62 logs out the remote operation terminals 20 that is logged in to block the remote control from the remote operation terminals 20.

The machine controller 42 controls an action or a setting of each component of the semiconductor manufacturing apparatus 10 based on the request or the execution instruction from the screen managing unit 40. The input/output unit 44 sends the control command sent from the machine controller 42 to each corresponding component of the semiconductor manufacturing apparatus 10, and receives necessary information from each component. The information received by the input/output unit 44 includes sensor output data. The machine controller 42 sends the information received by the input/output unit 44 from each component of the semiconductor manufacturing apparatus 10 to the screen managing unit 40. For example, the screen managing unit 40 uses the information received from each component of the semiconductor manufacturing apparatus 10 to create the screen data of the apparatus screen. The local/remote changeover switch state determining unit 46 determines whether the local/remote changeover switch 14 is the selected state of the remote operation terminals 20 or the selected state of the local operation terminal 12.

[Screen]

Figure 4:
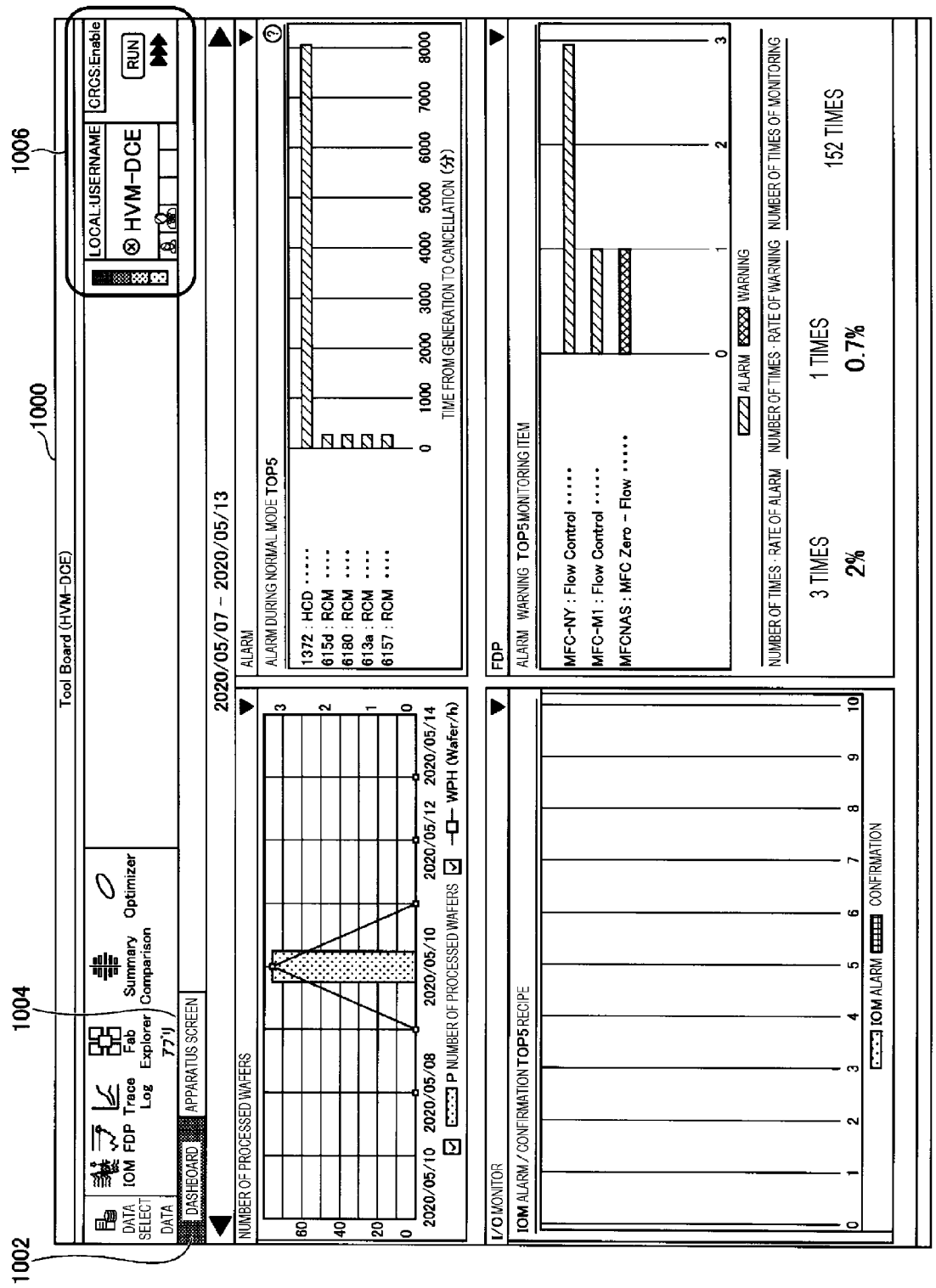
FIG. 4 is an image diagram of an example of a screen displayed during login.

FIG. 4 is an image diagram of an example of a screen displayed during login. A screen 1000 in FIG. 4 is displayed on the local operation terminal 12 and the remote operation terminals 20 that are logged in. On the screen 1000 in FIG. 4, a dashboard screen and the apparatus screen may be switched and displayed by tabs 1002 and 1004. The screen 1000 in FIG. 4 is an example in which the tab 1002 is selected and the dashboard screen is displayed.

Further, an apparatus state display field 1006 is displayed on the screen 1000. The apparatus state display field 1006 displays information such as the machine name of the semiconductor manufacturing apparatus 10, the login state of the local operation terminal 12, the logged-in user name of the local operation terminal 12, the usage state of the remote operation terminals 20, the logged-in user name of the remote operation terminals 20, the state of a signal tower of the semiconductor manufacturing apparatus 10, the alarm state of the semiconductor manufacturing apparatus 10, the state of the local/remote changeover switch 14, and the recipe execution state.

Figure 5:
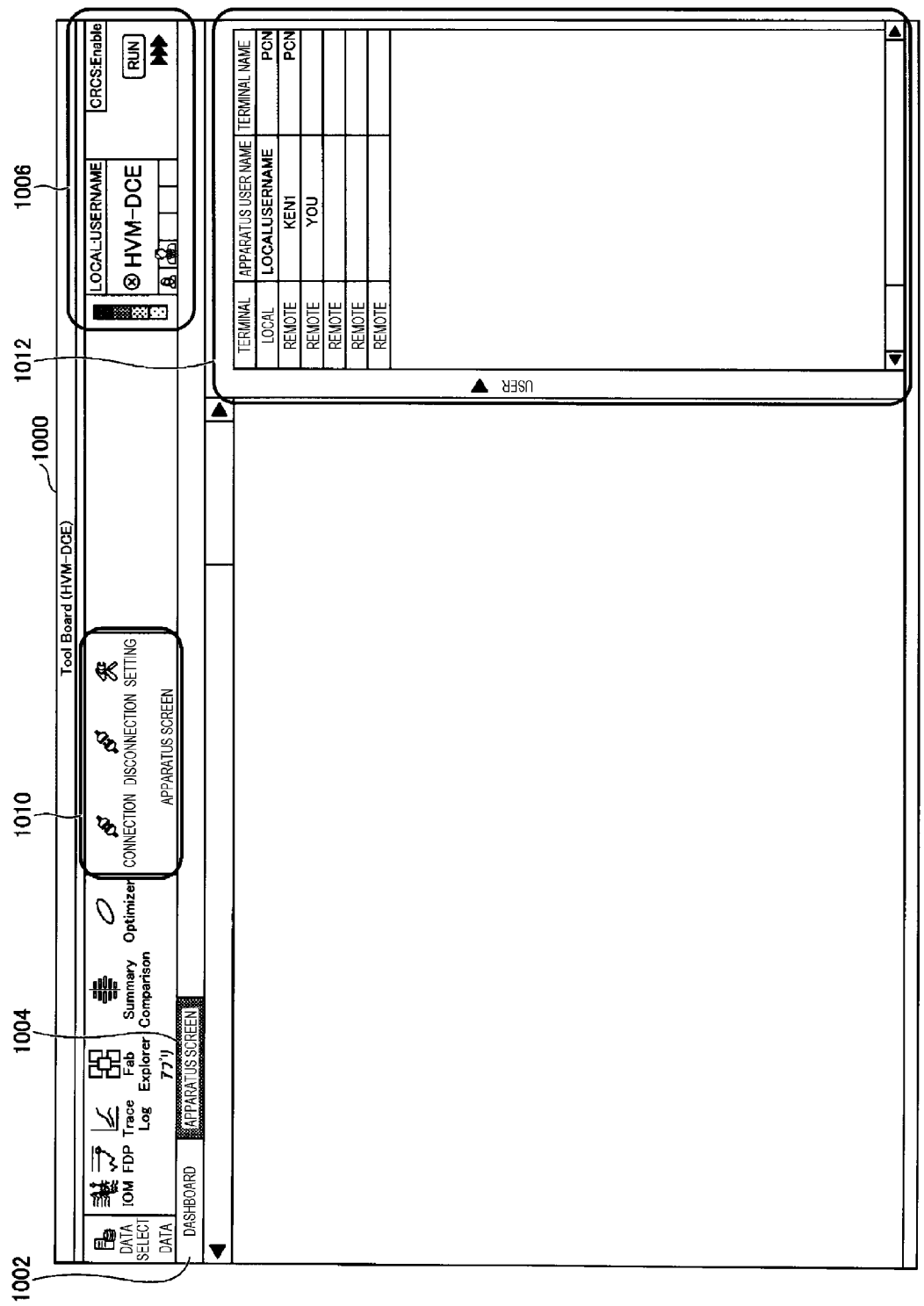
FIG. 5 is an image diagram of an example of a screen displayed during login.

When the tab 1004 is selected on the screen 1000 in FIG. 4, as illustrated in FIG. 5, a command icon 1010 for executing connection/disconnection to/from the apparatus screen of the semiconductor manufacturing apparatus 10, or setting of the apparatus screen is displayed on the screen 1000. Further, a user display field 1012 is displayed on the screen 1000 in FIG. 5. The user display field 1012 displays, for example, remote/local identification information, a user name, and a terminal name as user information of a user who is using the logged-in semiconductor manufacturing apparatus 10 (logged in).

Figure 6:
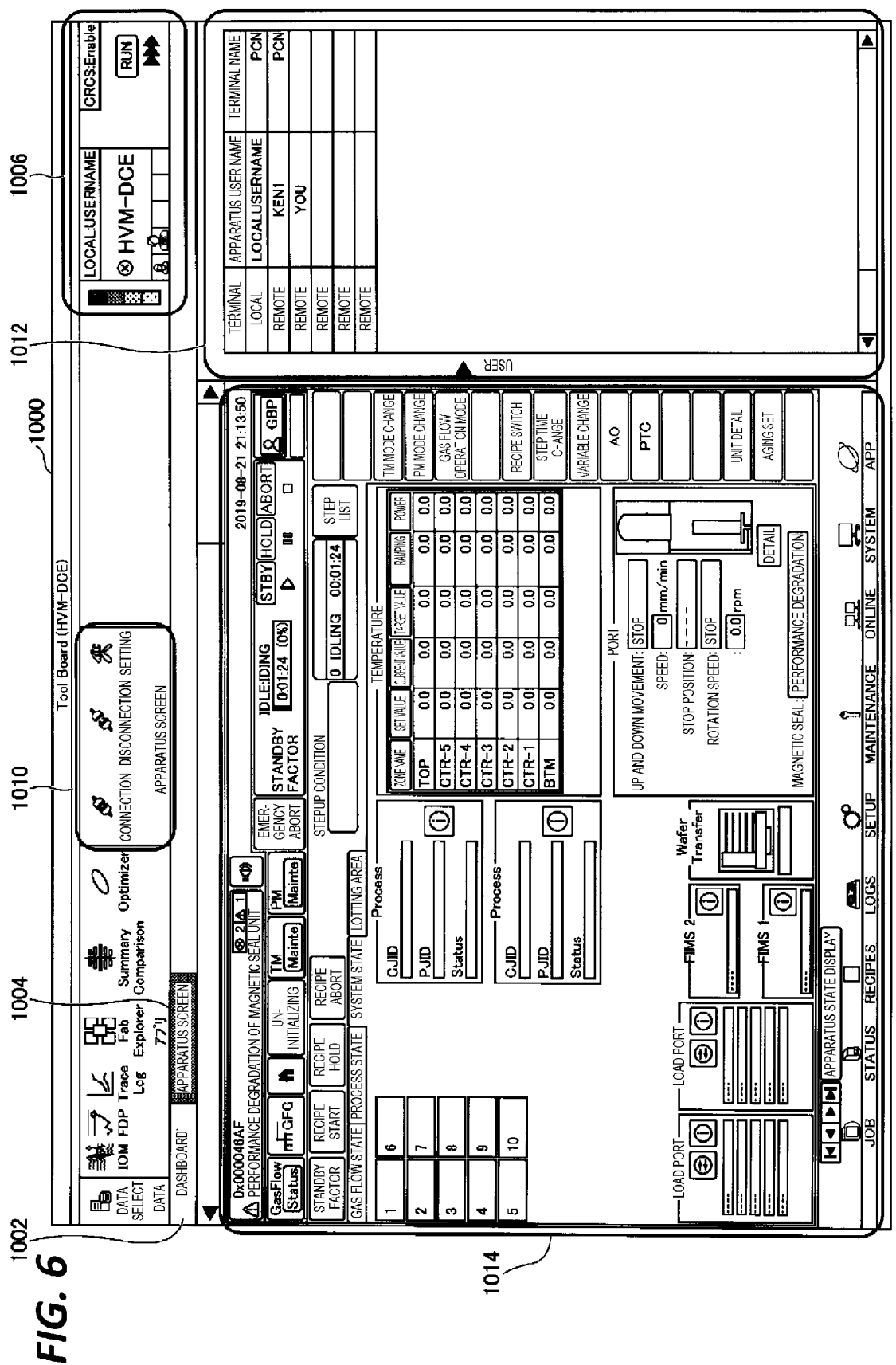
FIG. 6 is an image diagram of an example of a screen displayed during login.

When the command icon 1010 of the connection is selected on the screen 1000 in FIG. 5, as illustrated in FIG. 6, an apparatus screen 1014 of the semiconductor manufacturing apparatus 10 that is logged in is displayed on the screen 1000. The user that operates the local operation terminal 12 and the remote operation terminal 20 on which the apparatus screen 1014 in FIG. 16 is displayed may browse, for example, the gas flow state, the process state, and the system state of the semiconductor manufacturing apparatus 10 that is logged in by operating the apparatus screen 1014.

Further, the user that operates the local operation terminal 12 and the remote operation terminal 20 on which the apparatus screen 1014 in FIG. 6 is displayed may control the semiconductor manufacturing apparatus 10 that is logged in by operating the apparatus screen 1014. However, the apparatus screen 1014 may have a restriction on the operation received from the remote operation terminal 20. For example, the apparatus screen 1014 may be restricted so as not to receive the operation including the action of the semiconductor manufacturing apparatus 10 from the remote operation terminal 20.

Further, for example, when the local operation terminal 12 is logged in, the apparatus screen 1014 displayed on the remote operation terminal 20 may not receive the operation including the action of the semiconductor manufacturing apparatus 10. Further, when the local operation terminal 12 is logged in, the remote operation terminal 20 may be restricted so as not to display the apparatus screen 1014 of the operation including the action of the semiconductor manufacturing apparatus 10.

Further, since the individual apparatus screen 1014 may be simultaneously displayed on the local operation terminal 12 and the remote operation terminals 20 that are logged in, in the semiconductor manufacturing system 1 of the embodiment, exclusive control is performed between the apparatus screens 1014. For example, the apparatus screen 1014 on which the recipe is editable becomes a locked state during the editing of the recipe, and does not receive the operation for editing the recipe from other local operation terminal 12 and remote operation terminals 20.

Further, for example, when the local operation terminal 12 is logged in, the operation for editing the parameter from the apparatus screen 1014 of the parameter editing displayed on the remote operation terminals 20 may not be received.

FIG. 7 is a classification diagram illustrating an example of the exclusive control of the apparatus screen in the embodiment. The exclusive control of the apparatus screen 1014 illustrated in FIG. 7 is classified according to the simultaneous operation of local and remote, the type of restriction, and the change of the restriction state.

For example, the apparatus screen 1014 in which the simultaneous operation of local and remote is "possible," and the type of restriction is "no restriction" may always be operated from the local operation terminal 12 and the remote operation terminals 20 that are logged in.

The apparatus screen 1014 in which the simultaneous operation of local and remote is "possible," and the type of restriction is "screen display impossible" has a display restriction due to the operation restriction of the logged-in user with the change of the restriction state of "fixed," or a display restriction due to the state of the semiconductor manufacturing apparatus 10 with the change of the restriction state of "dynamic change."

The apparatus screen 1014 in which the simultaneous operation of local and remote is "possible," and the type of restriction is "screen display possible, simultaneous use possible, and command execution restriction" has an operation restriction due to the operation restriction of the logged-in user with the change of the restriction state of "fixed," or an operation restriction due to the state of the semiconductor manufacturing apparatus 10 with the change of the restriction state of "dynamic change."

The apparatus screen 1014 in which the simultaneous operation of local and remote is "possible," and the type of restriction is "screen display possible, simultaneous use possible, and editing restriction" has an operation restriction due to the operation restriction of the logged-in user with the change of the restriction state of "fixed," or an operation restriction due to the state of the semiconductor manufacturing apparatus 10 with the change of the restriction state of "dynamic change," or the login state of the local operation terminal 12.

For example, on the apparatus screen 1014 in which the simultaneous operation of local and remote is "impossible," and the type of restriction is "only local operation possible," only the local operation terminal 12 that is logged in may be operated.

[Processing]

Figure 8:
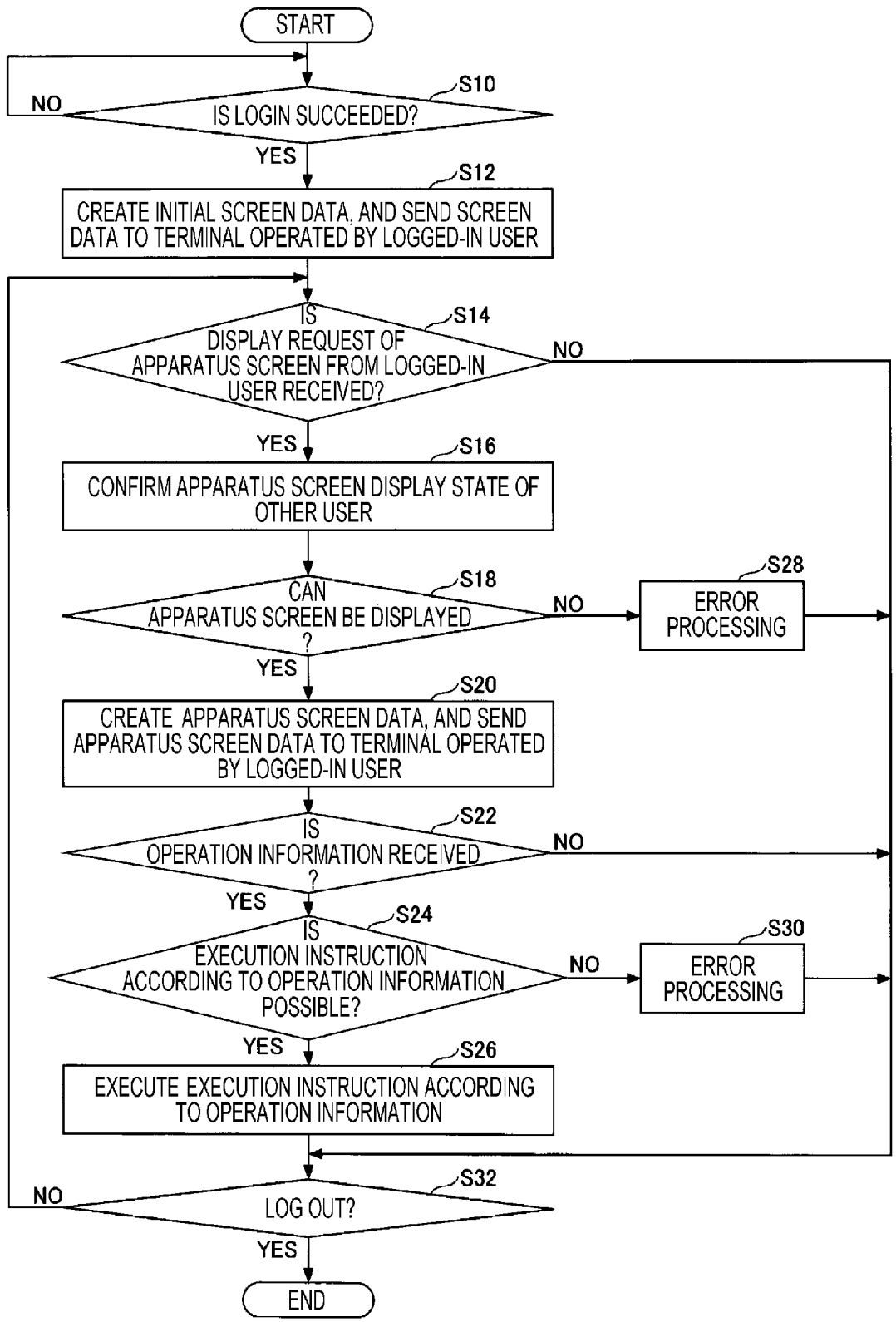
FIG. 8 is a flowchart of an example of a processing of the controller according to the embodiment.

FIG. 8 is a flowchart of an example of a processing of the controller according to the embodiment. The controller 30 of the semiconductor manufacturing apparatus 10 proceeds from step S10 to step S12 when the login for the login request from the local operation terminal 12 and the remote operation terminal 20 is succeeded. In step S12, the controller 30 creates initial screen data displayed by the local operation terminal 12 or the remote operation terminal 20 that is successfully logged in. The initial screen data displayed by the local operation terminal 12 or the remote operation terminal 20 that is successfully logged in is, for example, the screen data of the screen 1000 in FIG. 4.

The controller 30 sends the initial screen data to the local operation terminal 12 or the remote operation terminal 20 operated by the logged-in user who is successfully logged in. The local operation terminal 12 or the remote operation terminal 20 that receives the initial screen data displays, for example, an initial screen such as the screen 1000 in FIG. 4.

For example, the user of the local operation terminal 12 or the remote operation terminal 20 on which the screen 1000 in FIG. 4 is displayed may select the tab 1004, and then select the command icon 1010 for connection to request the display of the apparatus screen 1014. In the flowchart in FIG. 8, an update processing of the screen 1000 in FIG. 4 is omitted.

When the display request of the apparatus screen 1014 from the local operation terminal 12 or the remote operation terminal 20 operated by the logged-in user is received, the controller 30 proceeds to step S16. In step S16, the controller 30 confirms the apparatus screen display states of other users as information for the exclusive control.

In step S18, the controller 30 determines whether or not the apparatus screen 1014 can be displayed on the local operation terminal 12 or the remote operation terminal 20 operated by the logged-in user by the exclusive control. When it is determined that the apparatus screen 1014 can be displayed, in step S20, the controller 30 creates the screen data of the apparatus screen 1014, and sends the screen data to the local operation terminal 12 or the remote operation terminal 20 operated by the logged-in user. When it is determined that the apparatus screen 1014 cannot be displayed, the controller 30 proceeds to step S28, and, for example, executes an error processing that notifies that the apparatus screen 1014 cannot be displayed.

The local operation terminal 12 or the remote operation terminal 20 that receives the screen data of the apparatus screen 1014 displays, for example, the apparatus screen 1014 as illustrated in FIG. 6. For example, the user of the local operation terminal 12 or the remote operation terminal 20 on which the apparatus screen 1014 in FIG. 6 is displayed may send operation information on the semiconductor manufacturing apparatus 10 that is logged in to the controller 30 by operating the apparatus screen 1014.

When the operation information from the local operation terminal 12 or the remote operation terminal 20 operated by the logged-in user is received, the controller 30 proceeds from step S22 to step S24. In step S24, the controller 30 determines, based on the operation information received from the local operation terminal 12 or the remote operation terminal 20 that is operated by the logged-in user, whether or not the execution instruction to the semiconductor manufacturing apparatus 10 according to the operation information is possible, by the exclusive control.

When it is determined that the execution instruction is possible, the controller 30 executes the execution instruction according to the operation information in step S26, and controls the semiconductor manufacturing apparatus 10 that is logged in. When it is determined that the execution instruction is not possible, the controller 30 proceeds to step S30, and, for example, executes an error processing that notifies that the semiconductor manufacturing apparatus 10 received from the apparatus screen 1014 cannot be operated.

The controller 30 repeats steps S14 to S32 until the logout is requested from the local operation terminal 12 or the remote operation terminal 20 operated by the logged-in user, and ends the processing in the flowchart in FIG. 8 when the logout is requested.

SUMMARY

In the semiconductor manufacturing system 1 of the embodiment, the apparatus screen 1014 displays data on a plurality of screens, for example, 20 or more screens, depending on the type of data that the user wants to browse, such as a gas flow state or temperature.

In the semiconductor manufacturing system 1 of the embodiment, since the local operation terminal 12 and one or more remote operation terminals 20 that are logged in simultaneously display the independent apparatus screens 1014, it is possible to improve the working efficiency during the normal operation and the maintenance.

For example, in the semiconductor manufacturing system 1 of the embodiment, during the normal operation, the user who wants to browse the temperature of the semiconductor manufacturing apparatus 10, the user who wants to browse the gas flow state, and the user who wants to know the next cleaning time may browse different apparatus screens 1014 at the same time, and operate the semiconductor manufacturing apparatus 10 from the individual apparatus screens 1014 in parallel.

Further, for example, in the semiconductor manufacturing system 1 of the embodiment, during the maintenance, the user who wants to refer to a maintenance screen A of the semiconductor manufacturing apparatus 10 and the user who wants to refer to a maintenance screen B of the semiconductor manufacturing apparatus 10 may browse the maintenance screen A or the maintenance screen B from different apparatus screens 1014 at the same time, and perform the maintenance work of the semiconductor manufacturing apparatus 10 in parallel.

Further, in the semiconductor manufacturing system 1 of the embodiment, when a trouble occurs, the engineer can confirms the recipe setting, the parameter setting, and the sensor state in parallel from the remote operation terminals 20 while the operator performs an input/issuing processing on the local operation terminal 12, and thus, it is possible to improve the efficiency of the work.

According to the present disclosure, it is possible to provide a technology in which different apparatus screens of the semiconductor manufacturing apparatus may be simultaneously displayed on each of the local operation terminal and one or more remote terminals, and the operation on the semiconductor manufacturing apparatus is received from the apparatus screen.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:
1. A semiconductor manufacturing system comprising:
a local operation terminal configured to display a local apparatus screen of a semiconductor manufacturing apparatus for a local operator;
a remote operation terminal connected to the semiconductor manufacturing apparatus via a network, and configured to display a remote apparatus screen of the semiconductor manufacturing apparatus for a remote operator; and
a controller configured to control the semiconductor manufacturing apparatus based on an operation signal received from the local operation terminal and the remote operation terminal that display the local apparatus screen and the remote apparatus screen, respectively,
wherein the controller includes:
login state managing circuitry that manage a login state of each of the local operation terminal and the remote operation terminal into the semiconductor manufacturing system, the login state including a simultaneous login state in which the local operation terminal and the remote operation terminal are simultaneously logged in to the semiconductor manufacturing system;
apparatus screen display state managing circuitry that manage an apparatus screen display state of the local apparatus screen and the remote apparatus screen while the local operation terminal and the remote operation terminal are being logged in to the semiconductor manufacturing system;

screen data creating circuitry that create screen data for each of the local operation terminal and the remote operation terminal while the local operation terminal and the remote operation terminal are being logged in, based on the simultaneous login state and the apparatus screen display state of the local apparatus screen and the remote apparatus screen; and exclusive control circuitry that control the screen data created by the screen data creating circuitry such that the local apparatus screen and the remote apparatus screen displayed on the local operation terminal and the remote operation terminal, respectively, are different from each other while the local operation terminal and the remote operation terminal are logged in to the semiconductor manufacturing system, based on the simultaneous login state and the apparatus screen display state of the local apparatus screen and the remote apparatus screen.

2. The semiconductor manufacturing system according to claim 1, wherein, when the local operation terminal is logged in, the exclusive control circuitry do not create the screen data of the remote apparatus screen that receives, from a user of the remote operation terminal, the operation signal including an operation instruction of the semiconductor manufacturing apparatus.

3. The semiconductor manufacturing system according to claim 2, wherein, when the local operation terminal is not logged in, the exclusive control circuitry create the screen data of the remote apparatus screen that receives, from the user of the remote operation terminal, the operation signal including an operation instruction of the semiconductor manufacturing apparatus.

4. The semiconductor manufacturing system according to claim 3, wherein the controller further includes:
operation information determination circuitry that determine whether or not an execution instruction according to operation information received from the local operation terminal and the remote operation terminal that are logged in is possible for the semiconductor manufacturing apparatus based on the simultaneous login state and the apparatus screen display state; and
execution instructing circuitry that, when determined that the execution instruction is possible for the semiconductor manufacturing apparatus, execute the execution instruction according to the operation information on the semiconductor manufacturing apparatus, and control the semiconductor manufacturing apparatus.

5. The semiconductor manufacturing system according to claim 4, wherein, when the execution instruction according to the operation information is related to editing of a recipe or a parameter related to the semiconductor manufacturing apparatus, the operation information determination circuitry confirm a locked state of the recipe or the parameter of an editing target, and when the recipe or the parameter of the editing target is not in the locked state, change the recipe or the parameter to the locked state and determine that an editing instruction for the recipe or the parameter related to the semiconductor manufacturing apparatus is possible, or when the recipe or the parameter of the editing target is in the locked state, determine that the editing instruction for the recipe or the parameter related to the semiconductor manufacturing apparatus is not possible.

6. The semiconductor manufacturing system according to claim 5, wherein the controller further includes:

state determination circuitry that determine a state of a local/remote changeover switch that selects either the local operation terminal or the remote operation terminal; and
remote operation blocking circuitry that, when the selection of the state determination circuitry is switched from the remote operation terminal to the local operation terminal, log out the remote operation terminal that is logged in.

7. The semiconductor manufacturing system according to claim 1, wherein the controller further includes:
operation information determination circuitry that determine whether or not an execution instruction according to operation information received from the local operation terminal and the remote operation terminal that are logged in is possible for the semiconductor manufacturing apparatus based on the simultaneous login state and the apparatus screen display state; and
execution instructing circuitry that, when determined that the execution instruction is possible for the semiconductor manufacturing apparatus, execute the execution instruction according to the operation information on the semiconductor manufacturing apparatus, and control the semiconductor manufacturing apparatus.

8. The semiconductor manufacturing system according to claim 7, wherein, when the execution instruction according to the operation information is related to editing of a recipe or a parameter related to the semiconductor manufacturing apparatus, the operation information determination circuitry confirm a locked state of the recipe or the parameter of an editing target, and when the recipe or the parameter of the editing target is not in the locked state, change the recipe or the parameter to the locked state and determine that an editing instruction for the recipe or the parameter related to the semiconductor manufacturing apparatus is possible, or when the recipe or the parameter of the editing target is in the locked state, determine that the editing instruction for the recipe or the parameter related to the semiconductor manufacturing apparatus is not possible.

9. The semiconductor manufacturing system according to claim 1, wherein the controller further includes:
state determination circuitry that determine a state of a local/remote changeover switch that selects either the local operation terminal or the remote operation terminal; and
remote operation blocking circuitry that, when the selection of the state determination circuitry is switched from the remote operation terminal to the local operation terminal, log out the remote operation terminal that is logged in.

10. The semiconductor manufacturing system of claim 1, wherein the apparatus screen display state includes a type of restriction, a change in restriction state, a type of information to be displayed, and a type of executable work corresponding to a corresponding apparatus screen.

11. The semiconductor manufacturing system of claim 10, wherein the type of restriction includes a screen display restriction, a simultaneous operation restriction, a remote operation terminal restriction, an execution restriction, and an editing restriction.

12. A control device that controls a semiconductor manufacturing apparatus, the control device comprising:
login state managing circuitry that manage a login state of a local operation terminal locally connected to the semiconductor manufacturing apparatus and a remote operation terminal connected to the semiconductor manufacturing apparatus via a network, the login state including a simultaneous login state in which the local operation terminal and the remote operation terminal are simultaneously logged in to the semiconductor manufacturing apparatus;

apparatus screen display state managing circuitry that manage an apparatus screen display state of a local apparatus screen of the local operation terminal and a remote apparatus screen of the remote operation terminal while the local operation terminal and the remote operation terminal are being logged in to the semiconductor manufacturing apparatus; and screen data creating circuitry that create screen data for each of the local operation terminal and the remote operation terminal while the local operation terminal and the remote operation terminal are being logged in to the semiconductor manufacturing apparatus, based on the simultaneous login state and the apparatus screen display state; and exclusive control circuitry that control the screen data created by the screen data creating circuitry such that the local apparatus screen and the remote apparatus screen displayed on the local operation terminal and the remote operation terminal, respectively, are different from each other while the local operation terminal and the remote operation terminal are logged in to the semiconductor manufacturing apparatus, based on the simultaneous login state and the apparatus screen display state of the local apparatus screen and the remote apparatus screen.

13. A control method that controls a semiconductor manufacturing apparatus, the control method comprising:

managing a login state of a local operation terminal locally connected to the semiconductor manufacturing apparatus and a remote operation terminal connected to the semiconductor manufacturing apparatus via a network, the login state including a simultaneous login state in which the local operation terminal and the remote operation terminal are simultaneously logged in to the semiconductor manufacturing apparatus;

managing an apparatus screen display state of a local apparatus screen and a remote apparatus screen for each of the local operation terminal and the remote operation terminal that are logged in; and creating screen data of the apparatus screen sent to each of the local operation terminal and the remote operation terminal that are logged in upon a screen data request from a first operation terminal of the local operation terminal and the remote operation terminal based on the simultaneous login state and the apparatus screen display state of a second operation terminal of the local operation terminal and the remote operation terminal that is logged in other than the first operation terminal; and controlling the screen data created by the creating such that the local apparatus screen and the remote apparatus screen displayed on the local operation terminal and the remote operation terminal, respectively, are different from each other while the local operation terminal and the remote operation terminal are logged in to the semiconductor manufacturing apparatus, based on the simultaneous login state and the apparatus screen display state of the local apparatus screen and the remote apparatus screen.

14. A non-transitory computer-readable recording medium having stored therein a program that causes a controller that controls a semiconductor manufacturing apparatus to function as:

login state managing circuitry that manage a login state of a local operation terminal locally connected to the semiconductor manufacturing apparatus and a remote operation terminal connected to the semiconductor manufacturing apparatus via a network, the login state including a simultaneous login state in which the local operation terminal and the remote operation terminal are simultaneously logged in to the semiconductor manufacturing apparatus;

apparatus screen display state managing circuitry that manage an apparatus screen display state of a local apparatus screen of the local operation terminal and a remote apparatus screen of the remote operation terminal while the local operation terminal and the remote operation terminal are being logged in to the semiconductor manufacturing apparatus; and screen data creating circuitry that create screen data for each of the local operation terminal and the remote operation terminal while the local operation terminal and the remote operation terminal are being logged in to the semiconductor manufacturing apparatus, based on the simultaneous login state and the apparatus screen display state; and exclusive control circuitry that control the screen data created by the screen data creating circuitry such that the local apparatus screen and the remote apparatus screen displayed on the local operation terminal and the remote operation terminal, respectively, are different from each other while the local operation terminal and the remote operation terminal are logged in to the semiconductor manufacturing apparatus, based on the simultaneous login state and the apparatus screen display state of the local apparatus screen and the remote apparatus screen.

* * * * *